United States Patent [19]

McKelvey

[11] 3,821,752

[45] June 28, 1974

[54] ELECTRONIC INTERFERENCE DETECTOR FOR RANGE-TRACKING PULSE RADAR SYSTEMS

[75] Inventor: James F. McKelvey, Riverside, Calif.

[73] Assignee: The United States of America as represented by the Secretary of the Navy, Washington, D.C.

[22] Filed: Aug. 31, 1966

[21] Appl. No.: 576,785

[52] U.S. Cl. .............................. 343/7.3, 343/18 E
[51] Int. Cl. ......................... G01s 9/14, G01s 7/36
[58] Field of Search .................. 343/7.3, 17.1, 18 E

[56] References Cited
UNITED STATES PATENTS 2,989,652  6/1961  Hall ................................ 343/7.3 X
3,014,182  12/1961  Shallon .......................... 343/7.3 X Primary Examiner—T. H. Tubbesing
Attorney, Agent, or Firm—Richard S. Sciascia; Joseph M. St. Amand; T. M. Phillips

[57] ABSTRACT

An electronic interference detector which utilizes the minimum video amplitude at target return time as the criterion for detector action. In radar operation this will insure that the detector threshold will be directly related to the effective noise-to-signal ratio so that the detector threshold can be set at a value such that the radar tracking modes will be altered only when necessary.

2 Claims, 2 Drawing Figures

JAMES F. McKELVEY
INVENTOR.

BY *F. M. Phillips*

ATTORNEYS

ELECTRONIC INTERFERENCE DETECTOR FOR RANGE-TRACKING PULSE RADAR SYSTEMS

The invention herein described may be manufactured and used by or for the Government of the United States of America for governmental purposes without the payment of any royalties thereon or therefor.

The present invention relates to electronic interference detectors and more particularly to electronic interference detectors for range-tracking pulse radar systems. Various detectors have been used to detect the presence of electronic interference in the return signal of a fire-control radar system, for example, by sampling the noise during radar dead time, rectifying and filtering this noise, and comparing the resulting DC level to a reference level. Another detector of this type compared the target-derived automatic gain control voltage with the noise-derived automatic gain control voltage and when the noise automatic gain control voltage became greater than the target automatic gain control voltage due to jamming action, an output signal was generated to indicate this condition. Both of these previously known detectors were designed for protection against barrage type jamming. Many other forms of interference, such as swept noise and swept CW jamming, and interference from other radars, provided an output signal when the interfering signals were up to 25 db lower than necessary to interrupt automatic tracking. The automatic tracking functions were thereby degraded by detector action in many instances when normal tracking would otherwise have been possible.

The present invention provides a detecting device which will detect the presence of electronic interference in the return signal of a fire-control radar system and provides an output signal only when the intensity of the interference is sufficient to hamper the automatic tracking functions of the radar system. The output signal is used to alert the radar operator and or initiate changes in the automatic tracking functions so that previously accumulated target information is not destroyed. By comparing the minimum (most negative) portion of the video signal at the expected time of target signal return with a predetermined reference level, an output signal is provided when the minimum target video amplitude is below the predetermined value. Target return power produces a video pulse; interfering noise signals reduce the minimum amplitude of the video pulse (as well as adding to its peak amplitude); thus, the minimum amplitude of the combined target and noise video tends to be inversely proportional to the effective jam-to-signal ratio.

Accordingly, an object of the invention is to provide an electronic interference detector which utilizes the minimum video amplitude at target return time as the criterion for detector action. Another object of the invention is to provide an electronic interference detector that will insure that the detector threshold will be directly related to the effective jam-to-signal ratio so that the detector threshold can be set at a value such that the radar tracking modes will be altered only when necessary.

Other objects and many of the attendant advantages of this invention will become readily appreciated as the same becomes better understood by reference to the following detailed description when considered in connection with the accompanying drawings wherein.

Figure 1:
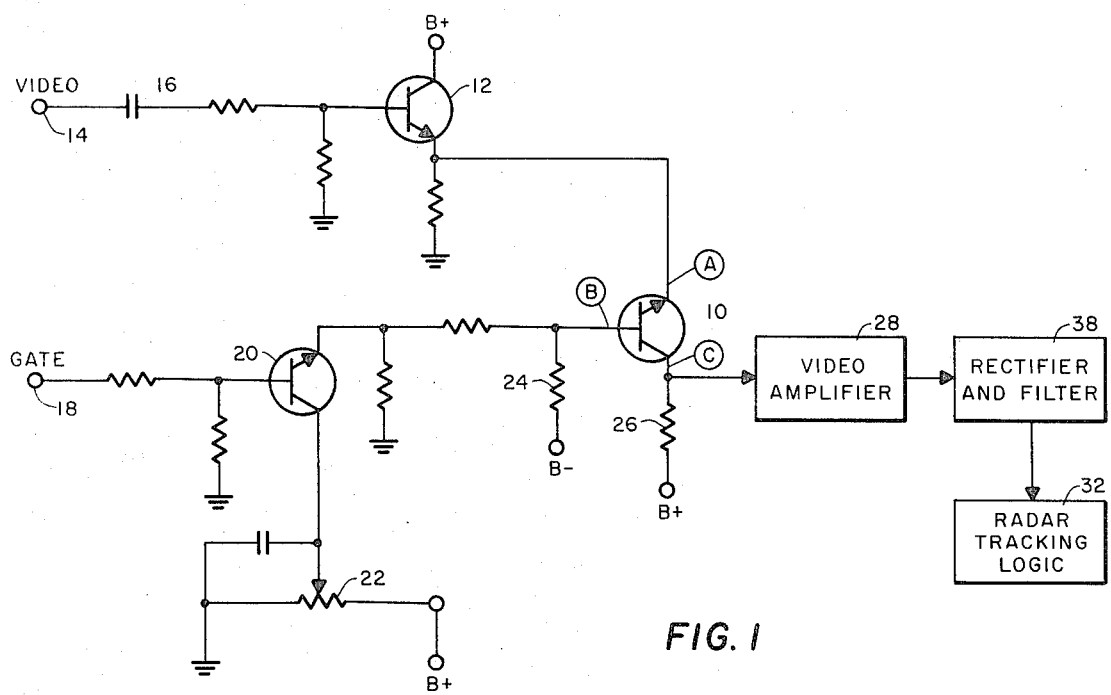
FIG. 1 is a schematic diagram of a preferred embodiment of the invention.

Referring now to the drawings there is shown in FIG. 1 a transistor 10 having its emitter connected to the output of an emitter follower 12. The radar video from the radar receiver, not shown, is fed from terminal 14 through coupling capacitor 16 to the base of emitter follower 12. The range track gate which is a positive gate generated by the radar transmitter, not shown, is fed from terminal 18 to the base of emitter follower 20. The output of emitter follower 20 is coupled to the base of transistor 10. The gate at terminal 18 occurs when a target return signal is expected and its width is equal to the width of the expected target video. The amplitude of the gate signal applied to the base of transistor 10 is controlled by means of potentiometer 22. The movable tap of potentiometer 22 is connected to the collector of transistor 20 and should be adjusted to provide a control signal at the base of transistor 10 which will permit it to conduct only when the minimum amplitude of the radar video at terminal 14 is less than one-half of its normal value. Transistor 10 is biased negatively through resistor 24 so that it will not conduct when there is no gate signal present at terminal 18, regardless of the amplitude of the radar video at terminal 14. The pulse developed across load resistor 26 when the range video at terminal 14 is less than one-half of its normal value is amplified, rectified, and filtered to provide a dc level voltage which is applied to logic network 32. The radar tracking functions would be modified by radar tracking logic network 32; however, the details of such a logic network depend upon the radar system with which the detector is to be used.

Figure 2:
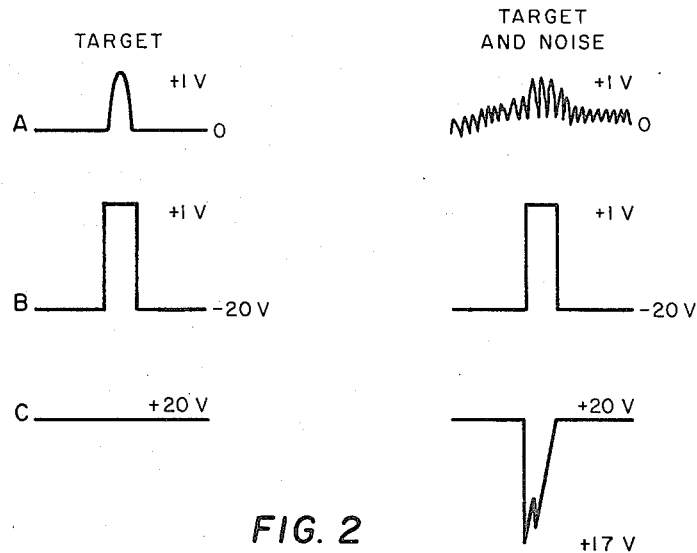
FIG. 2 are waveforms at various points in the diagram of FIG. 1.

Referring to FIG. 2 there is shown waveforms A, B, and C corresponding respectively to points A, B, and C in FIG. 1. The waveforms are shown with and without noise. There is no noise associated with the gate signal at point B. In the presence of a signal appearing at terminal 14 that has a minimum amplitude of one-half the value of waveform A or greater, there will be no signal output at the emitter of transistor 10. If a signal appears at terminal 14 during the gate (waveform B) which has a minimum amplitude of less than one-half that of waveform A, a portion of the video signal having the same width as gate waveform B will be passed by transistor 10. The function of transistor 10 inverts and amplifies the signal so that it appears as waveform C.

Obviously many modifications and variations of the present invention are possible in the light of the above teachings. It is therefore to be understood that within the scope of the appended claims the invention may be practiced otherwise than as specifically described.

What is claimed is:

1. An electronic interference detector for use with a range-tracking pulse radar comprising:
   a. a gating circuit having two inputs and an output,
   b. first circuit means for coupling an automatically gain controlled target video signal to one of said two inputs,
   c. second circuit means for producing a reference level gate signal whose amplitude is proportional to the minimum amplitude of a target video signal that is capable of being tracked, said reference level gate signal being applied to the other of said two inputs in time coincidence with the target return signal, d. said gating circuit being responsive to said reference level gate signal and to said target video signal for producing an output signal when the minimum amplitude of said target video signal is less than the amplitude of said reference level gate.

2. The circuit of claim 1 wherein said second circuit means includes an emitter follower having a variable bias voltage coupled to the collector of said emitter follower for providing an adjustable output voltage at the emitter.

* * * * *